US006071842A

United States Patent [19]
Takahashi et al.

[11] Patent Number: 6,071,842
[45] Date of Patent: Jun. 6, 2000

[54] BARIUM TITANATE-BASED SEMICONDUCTOR CERAMIC

[75] Inventors: Chihiro Takahashi, Chiba-ken; Shigeki Sato, Narita, both of Japan

[73] Assignee: TDK Corporation, Tokyo, Japan

[21] Appl. No.: 09/305,363

[22] Filed: May 5, 1999

Related U.S. Application Data

[63] Continuation of application No. PCT/JP98/03923, Sep. 2, 1998.

[30] Foreign Application Priority Data

Sep. 5, 1997 [JP] Japan .................................... 9-257458

[51] Int. Cl.[7] .................................................. C04B 35/468

[52] U.S. Cl. ........................... 501/137; 501/138; 501/139

[58] Field of Search .................................... 501/137, 138, 501/139

[56] References Cited

FOREIGN PATENT DOCUMENTS

| | | |
|---|---|---|
| 62-296401 | 12/1987 | Japan . |
| 04338601A | 11/1992 | Japan . |
| 4-311002 | 11/1992 | Japan . |
| 4-338601 | 11/1992 | Japan . |
| 7-297009 | 11/1995 | Japan . |
| 07335404A | 12/1995 | Japan . |
| 7-335404 | 12/1995 | Japan . |

OTHER PUBLICATIONS

CAPLUS 1999:490419 Goto, "Barium titanate–based . . . ".
CAPLUS 1988:521008 Yamamoto, "Barium titanate–type . . . ", 1999.

*Primary Examiner*—David Brunsman
*Attorney, Agent, or Firm*—Oblon, Spivak, McClelland, Maier & Neustadt, P.C.

[57] ABSTRACT

A barium titanate-based semiconducting ceramic, which contains $BaTiO_3$ as a main component thereof, and $Ba_2TiSi_2O_8$ and $Ba_nTi_mO_{n+2m}$ ($1 \leqq n \leqq 4$, $2 \leqq m \leqq 13$, $n \leqq m$), respectively, as trace-phase compositions, wherein the ratio of the contents of about $Ba_2TiSi_2O_8$ and $Ba_nTi_mO_{n+2m}$ ($Ba_2TiSi_2O_8/Ba_nTi_mO_{n+2m}$) as the trace-phase compositions is in the range of about 0.5 to 80.0. This semiconductive ceramic exhibits excellent voltage resistance and ensures high reliability as a product element. Moreover, it has a suitable room temperature resistivity ρ25 for functioning as a product element.

12 Claims, No Drawings

BARIUM TITANATE-BASED SEMICONDUCTOR CERAMIC

This is a continuation of PCT/JP98/03923 filed 2 Sep. 1998.

BACKGROUND OF THE INVENTION

1. Field of the Invention

The present invention relates to a barium titanate-based semiconducting ceramic (PTC thermistor) which has a positive temperature coefficient (PTC) and which is used as in a low-temperature heating element and in an automatic demagnetizer for a color TV.

2. Description of the Background

It is known that barium titanate, $BaTiO_3$, which has a perovskite type crystal structure is transformed by the addition of a minute amount of a semiconductor-forming agent such as a rare earth metal, niobium or antimony into a semiconductor, so as to manifest the PTC (positive temperature coefficient) phenomenon in which the magnitude of resistance abruptly increases at a temperature no less than the Curie point.

In recent years, studies have been actively carried out to elucidate this peculiar phenomenon and to find practical applications. The semiconducting ceramic compositions of the barium titanate type have found utility in various heating elements, and switching elements, sensors, and automatic demagnetizers for color TV.

The semiconducting ceramic of the barium titanate type is required to have high voltage resistance in order to ensure reliability as a product element. Further, for full operability as a product element, it is desirable to have appropriate room-temperature resistivity (for example, a resistivity ρ25 in the range of 10 to 400 Ω·cm) which is neither too large nor too small.

In order to increase voltage resistance, various proposals such as those as disclosed in JP-A-4-338601 and JP-A-7-335404, have been heretofore offered. Specifically, JP-A-4-338601 proposes that the voltage resistance be improved by setting the ratio, In/Is, of the X-ray diffraction intensity, In, of the $Ba_2TiSi_2O_8$ (111) plane in the central part of the sinter of a barium titanate semiconductor to the X-ray diffraction intensity, Is, of the $Ba_2TiSi_2O_8$ (111) plane in the surface part of the sinter to be not less than 7. JP-A-7-335404 proposes that a barium titanate type semiconducting ceramic having a high resistance temperature coefficient and a high voltage resistance be obtained by causing a main component of barium titanate to contain excess $TiO_2$ in the range of 0.5 to 3 mol %, relative to 1 mol of the main component.

The barium titanate type semiconducting ceramics disclosed in JP-A-4-338601 and JP-A-7-335404, mentioned above, both show source improvement in the voltage resistance, but is still unsatisfactory. Furthermore, the ceramic which is disclosed in JP-A-4-338601 has a room temperature resistance of about 0.85 to 0.87 which is too small. Besides, it is difficult to locate the point for measuring the X-ray diffraction intensity depending on the shape of an element, so that it is very difficult to produce the element which satisfies the requirements proposed in the publication. Further, the ceramic disclosed in JP-A-7-335404 is not suitable for the use described hereinbelow in accordance with the present invention because it has a room temperature resistance which is too large and which, thus, is almost an insulator.

SUMMARY OF THE INVENTION

Accordingly, it is an object of the present invention to provide a barium titanate-based semiconducting ceramic of high voltage resistance which ensures a highly reliable product element.

It is also an object of the present invention to provide a barium titanate type semiconducting ceramic having an appropriate room temperature resistivity (for example, a resistivity ρ25 in the range of 10 to 400 Ω·cm) which is neither too large nor too small for fully functioning as a product element.

DETAILED DESCRIPTION OF THE PREFERRED EMBODIMENT

In more detail, the present invention provides to a barium titanate-based semiconducting ceramic containing $BaTiO_3$ as a main component and $Ba_2TiSi_2O_8$ and $Ba_nTi_mO_{n+2m}$ ($1 \leqq n \leqq 4$, $2 \leqq m \leqq 13$, $n \leqq m$), respectively, as trace-phase compositions, wherein a ratio of the contents of $Ba_2TiSi_2O_8$ and $Ba_nTi_mOn+2_{n+2m}$ as the trace-phase compositions ($Ba_2TiSi_2O_8/Ba_nTi_mO_{n+2m}$) is in the range of 0.5 to 80.0.

In a first preferred manner, the present invention is so arranged that a proportion of the content of $Ba_2TiSi_2O_8$ as the trace-phase composition, as expressed in a ratio of peak integral intensity of X-ray diffraction (XRD) of a $Ba_2TiSi_2O_8$ phase to that of a $BaTiO_3$ perovskite phase ((211) plane peak integral intensity of the $Ba_2TiSi_2O_8$ phase/(110) plane peak integral intensity of the perovskite phase), is in the range of 0.002 to 0.03.

In a second preferred manner, the present invention is so arranged that the ratio of peak integral intensity ((211) plane peak integral intensity of the $Ba_2TiSi_2O_8$ phase/(110) plane peak integral intensity of the perovskite phase) is in the range of 0.003 to 0.02.

In a third preferred manner, the present invention is so arranged that when the main component, $BaTiO_3$, in raw material compounding is expressed as $ABO_3$ type barium titanate, A/B (molar ratio) is not less than 0.970 and less than 1.000 and the content of $SiO_2$ in the raw material compounding is in the range of 0.15 to 3.7 mol %.

In a fourth preferred manner, the present invention is so arranged that the ceramic composition contains a semiconductor-forming agent for conversion into a semiconductor.

In a fifth preferred manner, the present invention is so arranged that the ceramic composition contains Mn as a characteristic modifying agent.

A barium titanate-based semiconducting ceramic of the present invention contains a $BaTiO_3$ perovskite phase as a main component and contains, besides the phase, $Ba_2TiSi_2O_8$ and $Ba_nTi_mO_{n+2m}$ ($1 \leqq n \leqq 4$, $2 \leqq m \leqq 13$, $n \leqq m$) as trace-phase compositions.

In the present invention, the ratio of the contents of $Ba_2TiSi_2O_8$ and $Ba_nTi_mO_{n+2m}$ as the trace-phase compositions ($Ba_2TiSi_2O_8/Ba_nTi_mO_{n+2m}$) is in the range of 0.5 to 80.0. If this ratio of the contents is less than 0.5, there may rise disadvantages that the ceramic is not converted into a semiconductor, the room temperature resistivity ρ25 becomes extremely large, and the sintering property is deteriorated. On the other hand, if the ratio of the contents exceeds 80.0, there may rise disadvantages that the ceramic is not converted into a semiconductor, and the room temperature resistivity ρ25 becomes extremely small.

The formation of the $Ba_2TiSi_2O_8$ trace-phase is confirmed by the X-ray diffraction (XRD) as it manifests itself as a (211) plane peak in the range of 25 to 30 deg. of the X-ray diffraction chart. The formation of the $Ba_nTi_mO_{n+2m}$ trace-phase is likewise confirmed by the X-ray diffraction (XRD).

This is a barium titanate type trace-phase which is confirmed in the range of 25 to 30 deg. of the X-ray diffraction chart, wherein n<m, representing a Ti excess phase. The $Ba_nTi_mO_{n+2m}$ trace-phase assumes a plurality of kinds of the form of composition, depending on the values of n and m in the formula representing the composition. As concrete examples, (1) (the trace-phase answering the formula with n=4 and m=13), (2) (the trace-phase answering the formula with n=1 and m=2, (3) (the trace-phase answering the formula with n=2 and m=5), and (4) (the trace-phase answering the formula with n=2 and m=9) may be cited.

Incidentally, the ratio of the contents of $Ba_2TiSi_2O_8$ and $Ba_nTi_mO_{n+2m}$ ($Ba_2TiSi_2O_8/Ba_nTi_mO_{n+2m}$) is derived by the ratio of peak integral intensity in the X-ray diffraction (XRD), specifically, by the ratio of the (211) plane peak integral intensity of the $Ba_2TiSi_2O_8$ phase to the peak integral intensity of the $Ba_nTi_mO_{n+2m}$ phase. When the $Ba_nTi_mO_{n+2m}$ produces a plurality of peaks, depending on the values of n and m, the ratio mentioned above is derived with the total of the peak integral intensities taken as the peak integral intensity of the $Ba_nTi_mO_{n+2m}$ phase.

The ratio of the content of the $Ba_2TiSi_2O_8$ trace-phase mentioned above to the content of the $BaTiO_3$ perovskite phase as the main component, as expressed in the ratio of peak integral intensity of XRD of the $Ba_2TiSi_2O_8$ phase to that of the $BaTiO_3$ perovskite phase (the (211) plane peak integral intensity of the $Ba_2TiSi_2O_8$ phase/the (110) plane peak integral intensity of the perovskite phase), is in the range of 0.002 to 0.03, preferably 0.003 to 0.02. If this value is less than 0.002 or greater than 0.03, there may rise disadvantages that the ceramic is not converted into a semiconductor, the room temperature resistivity ρ25 becomes extremely large or small, and the sistering property is deteriorated.

In the formation of the $BaTiO_3$ perovskite phase as the main component and the trace-phases mentioned above, when the $BaTiO_3$ main component in the raw material compounding is expressed as $ABO_3$ type barium titanate, A/B (molar ratio) is preferred to be not less than 0.970 and less than 1.000. Here, A represents a divalent element, such as Ba, Ca or Pb, and B represents a tetravalent element, such as Ti, Zr or Sn.

$SiO_2$ is contained in the raw material compounding, and the $SiO_2$ content is preferred to be in the range of 0.15 to 3.7 mol %. If the $SiO_2$ content deviates from this range or $BaO/TiO_2$ (molar ratio) of the $BaTiO_3$ main component mentioned above deviates from the range mentioned above, the $Ba_2TiSi_2O_8$ trace-phase and the $Ba_nTi_mO_{n+2m}$ trace-phase are not formed in proportions specified by the present invention, so that there may rise disadvantages that the ceramic is not converted into a semiconductor, an appropriate room temperature resistivity ρ25 is not obtained, and the sintering property is deteriorated.

The composition of the barium titanate type semiconducting ceramic of the present invention contains a semiconductor-forming agent necessary for conversion into a semiconductor. The semiconductor-forming agent is preferred to be at least one selected from the group consisting of Y, rare earth elements (La, Ce, Pr, Nd, Pm, Sm, Eu, Gd, Th, Dy, Ho, Er, Tm, Yb, Lu), Nb, Ta, W, Sb, Bi, and Th. Particularly from the viewpoint of the cost of raw material, it is preferred to be at least one selected from the group consisting of Y, La, Ce, Nb, Ta, and Sb. The element may be contained in the composition in such a form as to substitute part of the constituent elements, such as Ba and Ti, of the perovskite type oxide having $BaTiO_3$ as the main component. The content of the semiconductor-forming agent in the main component ($BaTiO_3$) is generally preferred to be in the range of 0.03 to 0.5 wt. % as an oxide.

Further, the composition of the semiconducting ceramic is preferred to contain Mn as a characteristic modifying agent. By containing Mn, the resistant temperature coefficient can be increased. Mn may be contained in the composition in such a form as to substitute part of the constituent elements, such as Ba and Ti, of the perovskite type oxide. The content of Mn in the main component ($BaTiO_3$) is preferred to be not greater than 0.1 wt. % particularly, in the approximate range of 0.01 to 0.05 wt. % as MnO.

A method of producing the barium titanate type semiconducting ceramic according to the present invention will now be described. First, the raw materials are compounded and mixed so as to form $BaTiO_3$ as the main component and $Ba_2TiSi_2O_8$ and $Ba_nTi_mO_{n+2m}$ ($1 \leqq n \leqq 4$, $2 \leqq m < 13$, $n \leqq m$) as the trace-phase compositions respectively in given amounts. It is necessary that the aforementioned A/B (molar ratio) of the $BaTiO_3$ main component in the raw material compounding be not less than 0.970 and less than 1.000 and that the $SiO_2$ content in the raw material compounding be in the range of 0.15 to 3.7 mol %.

As the raw materials in this case, oxides or compound oxides are used. Otherwise, they may be properly selected from various compounds, such as carbonates, oxalates, nitrates, hydroxides and organic metal compounds, which are converted by firing into such oxides or compound oxides. These raw materials are generally used in the form of powder having an average particle diameter in the approximate range of 0.1 to 3 μm. As concrete examples of the raw materials to be used for the formation of the $BaTiO_3$ main component and the trace-phases $Ba_2TiSi_2O_8$ and $Ba_nTi_mO_{n+2m}$, $BaCO_3$, $TiO_2$, $SiO_2$, etc. may be cited. $SrCO_3$, $CaCO_3$, etc. may be further added when necessary. Generally, while the raw materials are compounded, the semiconductor-forming agent is also contained. As concrete examples of the semiconductor-forming agent, $Y_2O_3$, $La_2O_3$, $Ce_2O_3$, $Nb_2O_5$, $Ta_2O_5$, $Sb_2O_5$, etc. may be cited. Further, for improving the characteristic, a raw material for Mn is preferred to be added. As the raw material for Mn, $MnCO_3$, aqueous $Mn(NO_3)_2$ solution, etc. may be cited.

These raw materials are thrown into and mixed with one another all at once. The mixture may be effected in a dry mode or a wet mode. When the wet mode is adopted, a calcination may follow drying.

The raw materials thus compounded and mixed are calcined. The calcination is preferred to be effected at a calcining temperature in the range of 1,000 to 1,400 ° C. If this temperature is too low, the $BaTiO_3$ perovskite phase is not be fully formed. If the temperature is too high, a pulverization becomes difficult. The time for the calcination, as expressed by a maximum temperature holding time in the calcination, generally is in the approximate range of 0.5 to 6 hours. The temperature increasing or decreasing rate of the calcination may be in the approximate range of 100° C./hour to 500° C./hour. The calcination is carried out in an oxidizing atmosphere, generally in the open air.

The calcine obtained as described above is generally wet pulverized and then dried. The obtained powder is preferred to have an average particle diameter in the approximate range of 0.5 to 2.0 μm.

The material pulverized as described above is formed into a given shape and then subjected to formal firing. For facilitating the formation of the shaped mass, it is generally preferable to add a binder to the foregoing pulverized material. As the binder, polyvinyl alcohol (PVA) is advantageously used, for example. The amount of the binder to be added is generally in the approximate range of 0.5 to 5.0 wt. % relative to the amount of the pulverized material.

The formal firing is preferred to be carried out in an oxidizing atmosphere, particularly in the open air. The firing temperature is preferred to be in the range of 1300 to 1400° C. If the firing temperature is too low, the resistivity of the ceramic as a product does not become small and thus conversion into a semiconductor does not become sufficient. On the other hand, if the firing temperature is too high, the abnormal grain growth tends to occur.

The firing time in the formal firing is generally in the approximate range of 0.5 to 4.0 hours, as expressed by a maximum temperature holding time in the firing. The temperature increasing or decreasing rate of the formal firing may be in the approximate range of 100° C./hour to 500° C./hour.

The average grain size of the sinter is generally in the approximate range of 1 to 100 μm. though variable depending on the composition, the firing conditions, etc. The grain size can be derived from an optical microscope photograph or a scanning electron microscope (SEM) photograph of the section of the sinter which has been mirror-polished and etched.

In the present invention, the barium titanate type semiconducting ceramic can be obtained with the given characteristics, depending on the purpose and use. For example, the resistivity at room temperature (25° C.), ρ25, is in the range of 10 to 400 Ω·cm (preferably 40 to 100 Ω·cm) and the resistant temperature coefficient a is in the range of 10 to 20%/° C.

The resistivity ρ25 represents a value which is measured in an atmosphere kept at 25° C., using a sample produced by forming electrodes on the opposite main surfaces of a disc-shaped semiconducting ceramic with a diameter of 14 mm and a thickness of about 2.5 mm, by application of an In-Ga alloy. The resistant temperature coefficient a is determined by measuring the resistance of the sample while varying the temperature thereof and calculating the following formula (1) wherein T1 represents the temperature at which the resistance is twice the minimum resistance and T2 represents the temperature at which the resistance is 200 times the minimum resistance.

$$\alpha=[4.606/(T2-T1)]\times 100 \quad (1)$$

The barium titanate type semiconducting ceramic of the present invention can be used for the automatic control type heater (constant temperature heating element), for the temperature sensor and for the purpose of demagnetizing of the color TV or preventing the color TV from over-current.

Now, the present invention will be described in more detail below with reference to illustrative examples which are provided solely for purposed of illustration and are not intended to be limitative.

TEST EXAMPLE 1

Production of Semiconducting Ceramic Material $BaCO_3$ (average particle diameter 1 μm), $SrCO_3$ (average particle diameter 1 μm), $CaCO_3$ (average particle diameter 1 μm), $TiO_2$ (average particle diameter 1 μm), $Y_2O_3$ (average particle diameter 3 μm), an aqueous $Mn(NO_3)_2$ solution (0.1 mol aqueous solution), and $SiO_2$ (average particle diameter 3 μm) were prepared and they were compounded in a compounding ratio shown in Table 1 below. Then, they were wet mixed in a ball mill, dried and then calcined to obtain the calcines. The calcination was performed in the open air at a calcining temperature of 1,150° C. for a calcining time of 110 minutes (retention time). The calcine was wet pulverized in a ball mill and then dried to produce a semiconducting ceramic material. This material had an average particle diameter of 1 μm.

Production of Semiconducting Ceramic

The semiconducting ceramic material mentioned above and polyvinyl alcohol (PVA) added as a binder thereto in a proportion of 2 wt. % were together granulated and then press formed into discs. The discs were subjected to formal firing in the open air at 1,350° C. for 110 minutes (retention time) to produce disc-like semiconducting ceramic samples (Samples Nos. 1 to 13) having a diameter of 14 mm and a thickness of 2.5 mm.

The semiconducting ceramic samples thus obtained, with an In-Ga alloy applied to the opposite main surfaces thereof, were tested for resistivity ρ25 at room temperature as an electrical property. The obtained semiconducting ceramic samples were confirmed to have a positive temperature coefficient (PTC). Puncture voltage as an index of breakdown voltage was measured with respect to each of the samples according to the following procedure.

Breakdown Voltage

A sample was preheated by applying an AC voltage of 50 V between the terminals thereof. After the preheating, the voltage was applied raising from 0 V with intervals of 50 V, and retained for one minute at the applied voltages (50 V, 100 V, 150 V, . . . ). The applied voltage at which the sample was mechanically fractured or the current flowed in an amount not less than 100 mA was determined as the voltage resistance.

Further, the ratio of the contents of $Ba_2TiSi_2O_8$ and $Ba_nTi_mO_{n+2m}$ ($Ba_2TiSi_2O_8/Ba_nTi_mO_{n+2m}$) by the X-ray diffraction (XRD) was measured with respect to each of the samples. MXP3 System of Mac Science Company was used as a measuring instrument, and the measurement conditions were 400 mA of current, 40 kV of voltage, and 25 to 30 deg. of measuring angle. The contents of the trace-phases were derived from the integral intensities of the trace-phases of the samples and the calibration curves of the relevant trace-phases.

Sample No. 12 was obtained using 1,380° C. for the temperature of the formal firing.

The results are shown in Table 1 below.

In Table 1, Sample No. 11 was mostly formed of a trace-phase answering the formula with n=1 and m=2, Sample 12 mostly formed of a trace-phase answering the formula with n=2 and m=5, Sample No. 13 mostly formed of a trace-phase answering the formula with n=2 and m=9, and the other samples were formed mostly of a trace-phase answering the formula with n=4 and m=13. As a result of measuring proportions of the contents of $Ba_2TiSi_2O_8$ as the trace-phase composition with respect to all the samples of the present invention shown in Table 1, these values were confirmed to fall within the range of 0.002 to 0.03, as expressed in the ratio of peak integral intensity of the X-ray diffraction (XRD) of the $Ba_2TiSi_2O_8$ phase to that of the $BaTiO_3$ perovskite phase (the (211) plane peak integral intensity of the $Ba_2TiSi_2O_8$ phase/the (110) plane peak integral intensity of the perovskite phase).

TABLE 1

| Sample No. | BaO | SrO | CaO | $YO_{3/2}$ | $TiO_2$ | MnO | $SiO_2$ | $SiO_2$ content in the total of raw materials (mol %) | A/B (molar Ratio) | ($Ba_2TiSi_2O_8$/ $Ba_nTi_mO_{(n+2m)}$) | room temperature resistivity $\rho_{25}$ ($\Omega \cdot cm$) | breakdown voltage (V) |
|---|---|---|---|---|---|---|---|---|---|---|---|---|
| | Components of raw materials as oxide (mol) | | | | | | | | | | | |
| 1* | 0.754 | 0.197 | 0.030 | 0.004 | 1.000 | 0.001 | 0.0002 | 0.01 | 0.985 | 0.453 | 3850 | 1600 |
| 2* | 0.742 | 0.194 | 0.029 | 0.004 | 1.000 | 0.001 | 0.0109 | 0.55 | 0.969 | 0.485 | not converted into semiconductor | — |
| 3 | 0.745 | 0.195 | 0.029 | 0.004 | 1.000 | 0.001 | 0.0181 | 0.91 | 0.973 | 5.530 | 67 | 950 |
| 4 | 0.751 | 0.196 | 0.029 | 0.004 | 1.000 | 0.001 | 0.0145 | 0.73 | 0.980 | 4.953 | 49 | 850 |
| 5 | 0.751 | 0.196 | 0.029 | 0.004 | 1.000 | 0.001 | 0.0690 | 3.37 | 0.980 | 73.522 | 95 | 900 |
| 6* | 0.751 | 0.196 | 0.029 | 0.004 | 1.000 | 0.001 | 0.0907 | 4.38 | 0.980 | 84.856 | not converted into semiconductor | — |
| 7 | 0.751 | 0.196 | 0.029 | 0.004 | 1.000 | 0.001 | 0.0363 | 1.80 | 0.980 | 12.778 | 77 | 700 |
| 8 | 0.760 | 0.198 | 0.030 | 0.005 | 1.000 | 0.001 | 0.0109 | 0.54 | 0.993 | 22.500 | 47 | 600 |
| 9 | 0.760 | 0.198 | 0.030 | 0.005 | 1.000 | 0.001 | 0.0181 | 0.90 | 0.993 | 34.375 | 49 | 700 |
| 10* | 0.766 | 0.200 | 0.030 | 0.005 | 1.000 | 0.001 | 0.0109 | 0.54 | 1.001 | 98.354 | 24 | 50 |
| 11 | 0.751 | 0.196 | 0.029 | 0.004 | 1.000 | 0.001 | 0.0109 | 0.55 | 0.980 | 2.195 | 52 | 550 |
| 12 | 0.751 | 0.196 | 0.029 | 0.004 | 1.000 | 0.001 | 0.0109 | 0.55 | 0.980 | 1.533 | 72 | 700 |
| 13 | 0.751 | 0.196 | 0.029 | 0.004 | 1.000 | 0.001 | 0.0036 | 0.18 | 0.980 | 0.638 | 80 | 750 |

The asterisk (*) represents a sample departing from the scope of this invention (sample of comparative example).

The effect of the present invention is evident from the foregoing results. Specifically, since the barium titanate based semiconducting ceramic of the present invention is so arranged as to contain $BaTiO_3$ as a main component thereof and $Ba_2TiSi_2O_8$ and $Ba_nTi_mO_{n+2m}$ ($1 \leqq n \leqq 4$, $2 \leqq m \leqq 13$, $n \leqq m$) respectively as trace-phase compositions wherein the ratio of the contents of $Ba_2TiSi_2O_8$ and $Ba_nTi_mO_{n+2m}$ ($Ba_2TiSi_2O_8/Ba_nTi_mO_{n+2m}$) as the trace-phase compositions is in the range of 0.5 to 80.0, it is highly excellent in voltage resistance and ensures high reliability as a product element. Moreover, it has an appropriate room temperature resistivity ρ25 for fully functioning as a product element.

The barium titanate based semiconducting ceramic of the present invention is used in, for example a low-temperature heating element or an automatic demagnetizer for a color TV, and has a positive temperature coefficient (PTC).

Obviously, numerous modifications and variations of the present invention are possible in light of the above teachings. It is therefore to be understood that many changes and modifications may be made to the above-described embodiments without departing from the spirit and the scope of the present invention.

What is claimed is:

1. A barium titanate-based semiconducting ceramic, comprising $BaTiO_3$ as a main component and $Ba_2TiSi_2O_8$ and $Ba_nTi_mO_{n+2m}$ ($1 \leqq n \leqq 4$, $2 \leqq m \leqq 13$, $n \leqq m$), respectively, as trace-phase compositions, wherein a ratio of the contents of $Ba_2TiSi_2O_8$ and $Ba_nTi_mO_{n+2m}$ as the trace-phase compositions ($Ba_2TiSi_2O_8/Ba_nTi_mO_{n+2m}$) is in the range of about 0.5 to 80.0.

2. The barium titanate-based semiconducting ceramic of claim 1, wherein a proportion of the content of $Ba_2TiSi_2O_8$ as said trace-phase composition, as expressed in a ratio of peak integral intensity of X-ray diffraction (XRD) of a $Ba_2TiSi_2O_8$ phase to that of a $BaTiO_3$ perovskite phase ((211) plane peak integral intensity of the $Ba_2TiSi_2O_8$ phase/(110) plane peak integral intensity of the perovskite phase), is in the range of about 0.002 to 0.03.

3. The barium titanate-based semiconducting ceramic of claim 2, wherein said ratio of peak integral intensity ((211) plane peak integral intensity of the $Ba_2TiSi_2O_8$ phase/(110) plane peak integral intensity of the perovskite phase) is in the range of about 0.003 to 0.02.

4. The barium titanate-based semiconducting ceramic of claim 1, wherein when the main component, $BaTiO_3$, in raw material compounding is expressed as $ABO_3$ type barium titanate, A/B (molar ratio) is not less than about 0.970 and less than 1.000 and the content of $SiO_2$ in the raw material compounding is in the range of about 0.15 to 3.7 mol %, wherein A is a divalent element and B is a tetravalent element.

5. The barium titanate-based semiconducting ceramic of claim 4, wherein A is selected from the group consisting of Ba, Ca, and Pb.

6. The barium titanate-based semiconducting ceramic of claim 4, wherein B is selected from the group consisting of Ti, Zr, and Sn.

7. The barium titanate-based semiconducting ceramic of claim 1, wherein a semiconductor-forming agent is contained for conversion into a semiconductor.

8. The barium titanate-based semiconducting ceramic of claim 7, wherein said semiconductor-forming agent is selected from the group consisting of oxides of Y, La, Ce, Pr Nd, Pm, Sm, Eu, Gd, Tb, Dy, Ho, Er, Tm, Yb, Lu, Nb, Ta, W, Sb, Pi, and Th.

9. The barium titanate-based semiconducting ceramic of claim 7, wherein said semiconductor-forming agent is present in an amount of from 0.03 to 0.5 wt % as an oxide.

10. The barium titanate-based semiconducting ceramic of claim 1, wherein Mn is contained in an effective amount as a characteristic modifying agent.

11. The barium titanate-based semiconducting ceramic of claim 10, wherein said Mn is contained therein in an amount if not greater than 0.1 wt %.

12. The barium titanate-based semiconducting ceramic of claim 11, wherein said Mn is contained therein in an amount of about 0.01 to 0.05 wt % as MnO.

* * * * *